(12) United States Patent
Smith et al.

(10) Patent No.: US 7,303,702 B2
(45) Date of Patent: Dec. 4, 2007

(54) REDUCED CUFFING IN BLOW MOLDING PROCESSES

(75) Inventors: Eric R. Smith, Denham Springs, LA (US); Clyde J. Bohne, Prairieville, LA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 413 days.

(21) Appl. No.: 10/774,316

(22) Filed: Feb. 6, 2004

(65) Prior Publication Data

US 2005/0173819 A1    Aug. 11, 2005

(51) Int. Cl.
*B29C 49/78* (2006.01)
(52) U.S. Cl. .................. 264/40.1; 264/523; 264/500
(58) Field of Classification Search ........... 264/40.1
See application file for complete search history.

(56) References Cited

U.S. PATENT DOCUMENTS

| 4,013,622 | A |   | 3/1977  | DeJuneas et al. ........ 260/49.95 |
|-----------|---|---|---------|-----------------------------------|
| 4,504,615 | A | * | 3/1985  | Mills .......................... 524/291 |
| 4,855,360 | A | * | 8/1989  | Duchesne et al. .......... 525/187 |
| 6,063,878 | A | * | 5/2000  | Debras et al. ................ 526/64 |
| 6,294,604 | B1|   | 9/2001  | Focquet et al. ............. 524/433 |
| 2003/0225194 | A1 |  | 12/2003 | Coffy et al. ................ 524/128 |

FOREIGN PATENT DOCUMENTS

CA              961998      *   1/1975   .................. 400/67

* cited by examiner

*Primary Examiner*—Monica A Huson

(57) ABSTRACT

Defects in a blow molding process are reduced or eliminated by providing a small amount of a low molecular weight polyethylene glycol to the composition blow molded.

23 Claims, No Drawings

REDUCED CUFFING IN BLOW MOLDING PROCESSES

FIELD OF THE INVENTION

The invention relates to the reduction or elimination of cuffing in blow molding processes.

BACKGROUND OF THE INVENTION

In the blow molding of polyethylene a processing problem can occur in which the parison will stick to the die momentarily prior to blowing an article such as a bottle. This condition is referred to as "cuffing", "curling", or "parison sticking". Minor parison cuffing can lead to problems such as marking or scoring of portions of the article, such as the base of the bottle, or forming of a bead of material on the inside seam of the article. In the most severe cases, cuffing can cause failure to properly form the article.

Parison cuffing is usually attributed to blow molding machine conditions such as damaged or mismatched tooling or improperly centered pressure rings. One way to solve the problem of cuffing is to perform special maintenance or conduct repair work to the head in which the cuffing occurs. This technique does not always eliminate the occurrence of cuffing.

It is known from CA 961998 to protect against gel streak formation in anti-oxidant stabilized polyolefin films by adding to the extrusion composition 0.01 to 0.1 wt. % polyalkylene glycol, based on the weight of the polyolefin.

U.S. Pat. No. 4,013,622 teach the reduction of breakdown in a film formed from low density polyethylene resin with the addition to the resin of 200-500 ppm polyethylene glycol having a molecular weight of 1,300-7,500.

More generally, U.S. Pat. No. 6,294,604 teaches desirable surface characteristics on extruded polymers by the use of fluorocarbon polymers as an additive with poly(oxyalkylene)polymers.

Carbowax™ PEG 300 is taught as a possible additive to a film comprising HDPE to "inhibit initial coloration" in U.S. patent application Ser. No. 2003/0225194.

The present inventors have surprisingly found that the addition of a small amount of a low molecular weight polyethylene glycol likewise reduces or eliminates parison cuffing in a blow molding process. The present inventors have also surprisingly found that lowering the melt index of the polymer used in the process reduces or eliminates the occurrence of parison cuffing. By combining these two features, a more robust blow molding composition is formed to provide an improved blow molding process whereby parison cuffing defects are reduced or eliminated.

SUMMARY OF THE INVENTION

The invention is directed to a polyethylene composition useful in blow molding processes to reduce or eliminate parison cuffing, to polyethylene blow molded articles having reduced parison cuffing defects, and to the articles made by blow molding processes using said composition.

The composition comprises a small amount of a low molecular weight polyethylene glycol. Optionally, the composition may comprise antioxidants such as hindered phenolics. In an embodiment the polyethylene is high density polyethylene (HDPE) homopolymer. In another embodiment, which may be a species of the HDPE homopolymer composition, the polyethylene composition does not contain fluorocarbons.

The process of the invention comprises blow molding the polyethylene having a small amount of low molecular weight polyethylene glycol into an article.

In another aspect of the invention, in response to unacceptable parison cuffing observed in a blow molding operation using a polyethylene having a first melt index, a second polyethylene having a melt index lower than the melt index of the first polyethylene, measured according to ASTM D-1238, is used (by, for instance, substitution of the first polyethylene for the second polyethylene or addition of the two polyethylenes) in the blow molding process. In a preferred embodiment, the second polyethylene further comprises a small amount of a low molecular weight polyethylene glycol.

The article having reduced parison cuffing defects is formed by blow molding the polyethylene having a small amount of low molecular weight polyethylene glycol added thereto. In an embodiment the article comprises HDPE homopolymer and a small amount of a low molecular weight polyethylene.

These and other objects, features, and advantages will become apparent as reference is made to the following detailed description, preferred embodiments, examples, and appended claims.

DETAILED DESCRIPTION

According to the invention, defects due to parison cuffing are reduced or eliminated by the introduction of a small amount of low molecular weight polyethylene glycol to a polyethylene composition used in blow molding process.

The term "small amount" as used herein will be an amount sufficient to cause observable or measurable reduction in parison cuffing. Parison cuffing defect can be manifested, for instance, by markings or scorings of the article molded, e.g., the base of a blow molded bottle, the formation of one or more beads of material on the inside seam of the molded part, or in extreme instances the failure to properly form the molded part. The exact amount will depend on the speed of the process, the temperature of the process, the composition being blow molded, the molecular weight of the polyethylene glycol added, the nature and amount of other additives, as well as the final shape and complexity of the molded part, and other factors which would be apparent to one of ordinary skill in the art.

Typically for an HDPE homopolymer, the amount of polyethylene glycol added to the composition will be in amount from about 400 ppm to about 2000 ppm, based on the weight of the composition. In embodiments, lower amounts from about 500 ppm, or about 600 ppm, or about 700 ppm, to upper amounts of about 800 ppm, or about 1100 ppm, or about 1200 ppm, or about 1400 ppm, are also contemplated, with ranges from any lower amount to any upper amount also being contemplated.

The term "low molecular weight" as used herein will mean a molecular weight such that the polyethylene glycol may be readily added on the blow molding line as an add pack, e.g., in preferred embodiments that it be a liquid at ambient or processing conditions. It is preferred that polyethylene glycol having a molecular weight of from a lower limit of about 200, or about 300, or about 350, to an upper limit of about 450, or about 500 or about 600, with ranges from any lower limit to any upper limit being contemplated. The polyethylene glycol maybe a mixture of various molecular weights. Appropriate polyethylene glycols are readily available commercially; they are typically sold using a trailing number indicating the molecular weight, e.g., "PEG 400" is polyethylene glycol having a molecular weight of 400. Carbowax™ PEG 400 is the preferred polyethylene glycol.

The base polyethylene material to which the polyethylene glycol is added maybe any polyethylene useful in blow molding articles, including polyethylene homopolymer or polymer comprising ethylene and one or more comonomers. Typical comonomers, when used, would include, without limitation, alpha olefins such as 1-hexene.

The benefits of the present invention are particularly seen using high density polyethylene (HDPE), or polyethylenes having densities greater than 0.940 g/cm$^3$, typically prepared with Ziegler-Natta or chromium based catalysts.

In a more preferred embodiment the HDPE is a homopolymer, i.e., the polymer consists of ethylene units and no comonomers. While any HDPE homopolymer useful in blow molding processes can benefit from the present invention, the benefit is especially seen in HPDE homopolymers having a melt index range of from a lower limit of about 0.25, or about 0.30, or about 0.35, or about 0.40 to an upper limit of from about 0.60, or about 0.65, or about 0.70, or about 0.75, or about 0.80 grams/10 minutes, measured according to ASTM D-1238. The polyethylene used may be a mixture of one or more polyethylenes or a bimodal polyethylene, and if a mixture or bimodal polyethylene is used, preferably a mixture or bimoldal homopolymer wherein the weight average melt index falls within the ranges specified above.

In a preferred embodiment the composition comprises a 50:50 mixture, by wt. %, of AD60-007 and AA60-003, HDPEs having melt indices of 0.7 and 0.3, respectively, available from ExxonMobil Chemical Company, Baytown Tex.

In addition to the polyethylene glycol, other additives may be used. Numerous additives known as polymer processing aids or PPAs are recognized in the art, such as fluorocarbons discussed above, antioxidants (e.g., hindered phenolics such as IRGANOX™ 1010 and IRGANOX™1076 or phosphites such as IRGAFOS™ 168, ULTRANOX™ 626, and DOVERPHOS™ S-9228); tackifiers, such as polybutenes, terpene resins, aliphatic and aromatic hydrocarbon resins, alkali metal and glycerol, stearates and hydrogenated rosins; UV stabilizers; heat or thermal stabilizers; release agents; anti-static agents; pigments; colorants; dyes; waxes; and the like.

However, a particular advantage of the present invention is that the small amount of low molecular weight polyethylene glycol renders unnecessary most if not all of these additives.

Thus, in a preferred embodiment, the composition does not contain fluorocarbons. In another preferred embodiment, the composition does not contain phosphites. In another preferred embodiment, the composition does not contain stearates. All of the aforementioned ingredients are typically added to blow molding polyethylene compositions but they are not necessary according to the present invention.

Thus, in a preferred embodiment the invention comprises HDPE, a small amount of a low molecular weight polyethylene glycol, and does not contain one or more of fluorocarbons, phosphites, and stearates. A composition according to the present invention and not containing any two of fluorocarbons, phosphites, and stearates, and a composition not containing all three of these ingredients is also contemplated.

In a preferred embodiment the composition comprising HDPE and a small amount of a low molecular weight polyethylene glycol also comprises an effective amount of a primary antioxidant. Preferred primary antioxidants include hindered phenolics, more preferably IRGANOX™ 1010 and IRGANOX™ 1076.

The amount of primary antioxidant to be added may vary depending on the nature of the polyethylene, process conditions, and other ingredients, but typically an effective amount will be that amount necessary, in combination with the small amount of low molecular weight polyethylene glycol, to protect the polyethylene from premature degradation due to extended exposure to melt temperature conditions. Typically for an HDPE homopolymer, the amount of primary antioxidant added to the composition will be in amount from about 300 ppm to about 1200 ppm. In embodiments, lower amounts from about 400 ppm, or about 500 ppm, to upper amounts of about 900 ppm, or about 1000 ppm, are also contemplated, with ranges from any lower amount to any upper amount also being contemplated.

In a preferred embodiment, the composition according to the invention consists essentially of HDPE homopolymer, a small amount of a low molecular weight polyethylene glycol, and an effective amount of a primary antioxidant, the basic and novel feature of this composition being that it reduces or eliminates parison cuffing defects without the necessity for fluorocarbons, phosphites, or stearates. In another preferred embodiment, the composition consists of HDPE homopolymer, a small amount of low molecular weight polyethylene glycol, and an effective amount of a low molecular weight primary antioxidant; no other ingredients are permissible in this embodiment.

In an embodiment, the polyethylene glycol is added in the form of an add pack on the blow molding line. In a preferred embodiment, the add pack will comprise polyethylene glycol and primary antioxidant in HDPE homopolymer at a concentration such that the final concentration in the blow molded composition is sufficient to reduce or eliminate parison cuffing, as described above. The appropriate concentration in the add pack can be readily ascertained by one of ordinary skill in the art in possession of the present disclosure. Other preferred add pack compositions include the compositions consisting essentially of HDPE, a small amount of a low molecular weight polyethylene glycol, and a primary antioxidant, and the composition consisting of these same ingredients, as discussed in the previous paragraph.

In a process according to the invention, a process of manufacturing a blow molded article comprises the introduction to the blow molding process line a polyethylene composition according to the present invention, described above. In an embodiment, the introduction of said composition may be in response to a perceived problem with parison cuffing defects. The perception that parison cuffing is a problem may be by any method of attaining awareness or understanding of parison cuffing defects, but particularly by visual or tactile observation of the parison cuffing phenomenon discussed in herein.

It should be understood that the introduction of the composition according to the present invention may also be in response to a calculation or anticipation of parison cuffing defects, for instance the expectation of parison cuffing defects based on the teachings of the present invention.

It is also a surprising discovery of the present inventors that switching to a polyethylene having a lower melt index also reduces or eliminates parison cuffing defects. Thus, in a second aspect of a process according to the present invention, in response to a perceived problem with parison cuffing in a process comprising blow molding an article, a polyethylene having a lower melt index is substituted in the line.

The important feature of this second aspect of the invention is that the polyethylene substituted into or added into the process is that it have a lower melt index. Thus, if the polyethylene being used in the process (the "first" polyethylene) wherein parison cuffing is observed is an HDPE homopolymer, typically the replacement polyethylene ("second" polyethylene) will likewise be an HDPE homopolymer but having a lower melt index.

It is preferred that the polyethylene substituted or added into the process be an HDPE homopolymer, i.e., the polymer consists of ethylene units and no comonomers. In a more preferred embodiment, the second polyethylene is an HPDE homopolymer having a melt index range of from a lower limit of about 0.25, or about 0.30, or about 0.35, or about 0.40 to an upper limit of from about 0.60, or about 0.65, or about 0.70, or about 0.75, or about 0.80 grams/10 minutes, measured according to ASTM D-1238. The polyethylene used may be a mixture of one or more polyethylenes or a bimodal polyethylene, and if a mixture or bimodal polyethylene is used, preferably a mixture or bimoldal homopolymer wherein the weight average melt index falls within the ranges specified above.

The present inventors have also observed that under certain circumstances a throughput penalty occurs in the process as a result of the substitution of a first polyethylene having a first melt index for a second polyethylene having a second melt index lower than the first melt index, as measure by ASTM D-1238, and that this problem can surprisingly be reduced or eliminated by the addition of a small amount of a low molecular weight polyethylene glycol as described herein.

In a preferred embodiment of this second aspect of the process according to the present invention, a small amount of a low molecular weight polyethylene glycol is added to this second polyethylene composition. It should be recognized that the addition of the polyethylene glycol in this second aspect can be in response to a perceived (or even anticipated) lower throughput as a result of using the lower melt index polyethylene, or perceived (or even anticipated) defects from parison cuffing, or for both reasons.

In another preferred embodiment of this second aspect of the process according to the present invention, the details of the second polyethylene composition mirror the details of the composition according the present invention, as described previously. Inotherwords, the meaning of "small amount", "low molecular weight", specific quantity ranges, molecular weights of the polyethylene glycol are identical for this embodiment as for the composition of the present invention described previously.

In yet another embodiment, in response to a perceived or anticipated parison cuffing problem in a blow molding process using a first polyethylene having a first melt index, at least one of the following responses is selected: (a) adding to the process line a second polyethylene having a second melt index lower than the first melt index, as measured by ASTM D-1238; (b) adding a small amount of a low molecular weight polyethylene glycol to the polyethylene composition in the process line. In the event it is perceived that parison cuffing defects have not been reduced sufficiently, at least one of the aforementioned responses may be selected again, e.g., again either (a) or (b) is selected. Preferably the response not selected first is the next selected response, thus first response (a) and then (b) or vice versa. However, in still another embodiment, in the event that the first response is to reduce the melt index of the polyethylene and this does not sufficiently reduce parison cuffing, the melt index may be lowered still further. Likewise, in the event choice (b) is made and parison cuffing is still observed, an additional quantity of polyethylene glycol maybe added, optionally changing the molecular weight of the polyethylene glycol.

It should be recognized that the aspect of the invention concerned with lowering the melt index of the composition being blow molded into an article maybe by complete substitution of the first polyethylene having the relatively higher melt index by a second polyethylene having a relatively lower melt index, or it can be by the addition and mixture of a second polyethylene having a relatively lower melt index with the first polyethylene having a relatively higher melt index. In the latter case the composition being blow molded will have, on a weight average basis, a lower melt index than the first composition being blow molded.

The following examples are meant to illustrate presently preferred embodiments of the present invention, wherein like numerals refer to like parts throughout. Numerous modifications and variations are possible, and it is to be understood that within the scope of the appended claims, the invention may be practiced otherwise than as specifically described herein.

EXAMPLE 1

A commercially available 6-Head Uniloy™ blow molding machine producing milk jugs for commercial sale in grocery stores is operated using AD60-007, an HDPE homopolymer having a melt index of 0.7 grams/10 min (ASTM D-1238), commercially available from ExxonMobil Chemical Company, Baytown, Tex. It is observed that cuffing conditions exist on heads 1-4. The severity of the cuffing is moderate with the exception of head 3. Head-3 exhibits severe cuffing resulting in frequent rejects due to folds in the bottom seam.

The line is then transitioned to a HDPE homopolymer having melt index of 0.5 grams/10 min (ASTM D-1238) with an add pack consisting of Carbowax™ PEG 400 and IRGANOX™ 1010. The amount of polyethylene glycol is sufficient to provide for a final concentration of 1100 PPM and the amount of primary antioxidant is sufficient to provide for a final concentration of 600 PPM. During the initial transition, slight adjustments to the parison weights are made to maintain consistent bottle weights. Slight increases in stock temperatures are noted (less than 2 degrees Celsius) with no effect on parison temperatures. Drive motor amperages are noted to increase less than 2 amperes. An immediate improvement in parison formation is observed due to a reduction in cuffing on heads 1-4. The resulting milk jugs do not show any evidence of parison cuffing defects.

EXAMPLE 2

Example 1 is repeated on a 4-Head Uniloy blow molding machine to manufacture commercial milk jugs. Again, parison cuffing defects are eliminated after the add pack is provided.

While the illustrative embodiments of the invention have been described with particularity, it will be understood that various other modifications will be apparent to and can be readily made by those skilled in the art without departing from the spirit and scope of the invention. It will be noted, for instance, that numerous embodiments, whether or not recited as preferred or more preferred, can be combined to achieve other embodiments not specifically recited herein—e.g., a particular quantity range of polyethylene glycol with a particular molecular weight range of polyethylene glycol, with a particular primary antioxidant, which, although not specifically recited herein, is still contemplated as being a part of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains. The following preferred embodiments are likewise not intended to be limiting, but rather could be modified as recognized by one of ordinary skill in the art in possession of the present disclosure, by the various embodiments set forth herein.

Preferred embodiments include: a process of manufacturing a blow molded article comprising: (a) blow molding a first composition comprising a first polyethylene into a shaped article; (b) perceiving parison cuffing defects in said process or said blow molded article; (c) then selecting at least one of the following in response to step (b): (i) providing to said process a second polyethylene having a lower melt index than said first polyethylene, measured according to ASTM D-1238; (ii) providing to said process a small amount of a low molecular weight polyethylene glycol; whereby a second composition is blow molded into an article, and also more preferred embodiments, which may be combined as would be recognized by one of skill in the art in possession of the present disclosure without more than routine experimentation: the aforementioned process wherein step (c) comprises providing a second polyethylene having a lower melt index than said first polyethylene and having incorporated therein a small amount of a low molecular weight polyethylene glycol; wherein the amount of polyethylene glycol provided to said process is from about 400 ppm to about 2000 ppm based on the weight of said second composition; wherein the amount of polyethylene glycol added is from about 400 ppm to about 1200 ppm based on the weight of the second composition; wherein the amount of polyethylene glycol added to the composition is no more than about 1100 ppm based on the weight of said second composition; any of the aforementioned ranges wherein the amount of polyethylene glycol added is no more than about 800 ppm, based on the weight of said second composition; wherein the amount of polyethylene glycol added is more than about 700 ppm, based on the weight of said second composition; any of the aforementioned ranges wherein the polyethylene glycol has a molecular weight of from about 300 to about 500; any of the aforementioned wherein step (c) further comprises selecting a least one second polyethylene from HDPE homopolymers having a melt index of from about 0.25 to about 0.80 grams/10 minutes measured according to ASTM D-1238, and/or wherein step (c) further comprises selecting at least one second polyethylene from HDPE homopolymers having a melt index of from about 0.25 to about 0.80 grams/10 minutes measured according to ASTM D-1238, and having incorporated therein a small amount of a low molecular weight polyethylene glycol and an effective amount of an antioxidant selected from IRGANOX™ 1010 and IRGANOX™ 1076.

Another preferred embodiment is a method of reducing cuffing in the blow molding of a composition comprising HDPE, said method comprising incorporating a small amount of a low molecular weight polyethylene glycol in said composition prior to blow molding to provide a new composition and then blow molding said new composition, and also more preferred embodiments where wherein said polyethylene glycol is present in the amount of from about 400 ppm to about 1200 ppm based on the weight of the composition; wherein said new composition does not contain a fluorocarbon polymer, phosphite or stearate; wherein said new composition further comprises an antioxidant selected from hindered phenolics; wherein said new composition consists essentially of HDPE, polyethylene glycol, and an antioxidant selected from hindered phenolics; wherein said polyethylene glycol is PEG-400; wherein said new composition comprises HDPE homopolymer having a melt index range of from about 0.25 to about 0.85 grams/10 minutes according to ASTM D-1238; any of the aforementioned wherein said process comprises the steps of: (a) providing a first HDPE having a first melt index in a blow molding process and blow molding said first HDPE into an article; (b) detecting unacceptable cuffing in said process; (c) transitioning from said first HDPE in said process to a composition comprising a second HDPE having a second melt index and having incorporated therein a small amount of a low molecular weight polyethylene glycol, wherein said second melt index is lower than said first melt index, measured according to ASTM D-1238; then (d) blow molding the composition comprising said second HDPE into an article; any of the aforementioned wherein the second HDPE has a melt index of from about 0.25 to about 0.80 grams/10 minutes measured according to ASTM D-1238.

Other preferred embodiments include an article made by any of the aforementioned process, especially a bottle or jug or other container suitable for holding a liquid, wherein said article consists essentially of HDPE homopolymer, a small amount of a low molecular weight polyethylene glycol, and an effective amount of an antioxidant (even more preferably wherein the antioxidant is a hindered phenolic).

Trade names used herein are indicated by a ™ symbol or ® symbol, indicating that the names may be protected by certain trademark rights, e.g., they may be registered trademarks in various jurisdictions.

All patents and patent applications, test procedures (such as ASTM method and the like), and other documents cited herein are fully incorporated by reference for all jurisdictions in which such incorporation is permitted.

When numerical lower limits and numerical upper limits are listed herein, ranges from any lower limit to any upper limit are contemplated.

The invention has been described above with reference to numerous embodiments and specific examples. Many variations will suggest themselves to those skilled in this art in light of the above detailed description. All such obvious variations are within the full intended scope of the appended claims.

What is claimed is:

1. A process of manufacturing a blow molded article comprising:
   (a) blow molding a first composition comprising a first polyethylene into a shaped article;
   (b) perceiving parison cuffing defects in said process or said blow molded article;
   (c) providing to said process a second polyethylene having a lower melt index than said first polyethylene, measured according to ASTM D-1238, and having incorporated therein a small amount of a low molecular weight polyethylene glycol; and
   (d) blow molding the composition comprising said second polyethylene into an article.

2. The process according to claim 1, wherein the amount of polyethylene glycol provided to said process is from about 400 ppm to about 2000 ppm based on the weight of said composition.

3. The process according to claim 2, wherein the amount of polyethylene glycol added is from about 400 ppm to about 1200 ppm based on the weight of the composition.

4. The process according to claim 2, wherein the amount of polyethylene glycol added to the composition is from about 400 ppm to about 1100 ppm based on the weight of said composition.

5. The process according to claim 2, wherein the amount of polyethylene glycol added is from about 400 ppm to about 800 ppm, based on the weight of said composition.

6. The process according to claim 2, wherein the amount of polyethylene glycol added is from about 400 ppm to about 700 ppm, based on the weight of said composition.

7. The process according to claim 1, wherein the polyethylene glycol has a molecular weight of from about 300 to about 500.

8. The process according to claim 1, wherein the second polyethylene is selected from HDPE homopolymers having a melt index of from about 0.25 to about 0.80 grams/10 minutes, measured according to ASTM D-1238.

9. The process according to claim 1, wherein the second polyethylene is selected from HDPE homopolymers having a melt index of from about 0.25 to about 0.80 grams/10 minutes measured according to ASTM D-1238, and having incorporated therein a small amount of a low molecular weight polyethylene glycol and an effective amount of an antioxidant.

10. A process of manufacturing a blow molded article comprising:
(a) blow molding a first composition comprising a first polyethylene into a shaped article;
(b) perceiving parison cuffing defects in said process or said blow molded article;
(c) selecting at least one second polyethylene from HDPE homopolymers having a melt index of from about 0.25 to about 0.80 grams/10 minutes measured according to ASTM D-1238, and having incorporated therein a small amount of a low molecular weight polyethylene glycol and an effective amount of an antioxidant; and
(d) blow molding the composition comprising said second polyethylene into an article.

11. A method of reducing cuffing in the blow molding of a composition comprising HDPE, said method comprising incorporating a small amount of a low molecular weight polyethylene glycol in said composition prior to blow molding to provide a new composition and then blow molding said new composition, wherein said new composition does not contain a fluorocarbon polymer, phosphate, or stearate.

12. The method according to claim 11, wherein said polyethylene glycol is present in the amount of from about 400 ppm to about 1200 ppm based on the weight of the new composition.

13. The method according to claim 11, wherein said now composition further comprises an antioxidant selected from hindered phenolics.

14. The method according to claim 11, wherein said new composition consists essentially of HDPE, polyethylene glycol, and an antioxidant selected from hindered phenolics.

15. The method according to claim 11, wherein said polyethylene glycol is PEG-400.

16. The method according to claim 11, wherein said new composition comprises HDPE homopolymer having a melt index range of from about 0.25 to about 0.85 grams/10 minutes according to ASTM D-1238.

17. A method of manufacturing a blow molded article comprising the steps of:
a. providing a first HDPE having a first melt index in a blow molding process and blow molding said first HDPE into an article;
b. detecting unacceptable cuffing in said process;
c. transitioning from said first HDPE in said process to a composition comprising a second HDPE having a second melt index and having incorporated therein a small amount of a low molecular weight polyethylene glycol, wherein said second melt index is lower than said first melt index, measured according to ASTM D-1238; and
d. blow molding the composition comprising said second HDPE into an article.

18. The method according to claim 17, wherein said second HDPE has a melt index of from about 0.25 to about 0.80 grams/10 minutes measured according to ASTM D-1238.

19. The method according to claim 17, wherein said composition does not contain a fluorocarbon polymer, phosphite or stearate.

20. The method according to claim 17, wherein said composition further comprises an antioxidant selected from hindered phenolics.

21. The method according to claim 17, wherein said composition consists essentially of HDPE, polyethylene glycol, and an antioxidant selected from hindered phenolics.

22. The method according to claim 17, wherein said polyethylene glycol is PEG-400.

23. The method according to claim 17, wherein the composition comprises about 400 ppm to about 1200 ppm of the polyethylene glycol based on the weight of the composition.

* * * * *